C. H. WIDSTRAND.
CROSS LINK FASTENER FOR NON-SKID CHAINS.
APPLICATION FILED JULY 11, 1918.
1,300,078.
Patented Apr. 8, 1919.
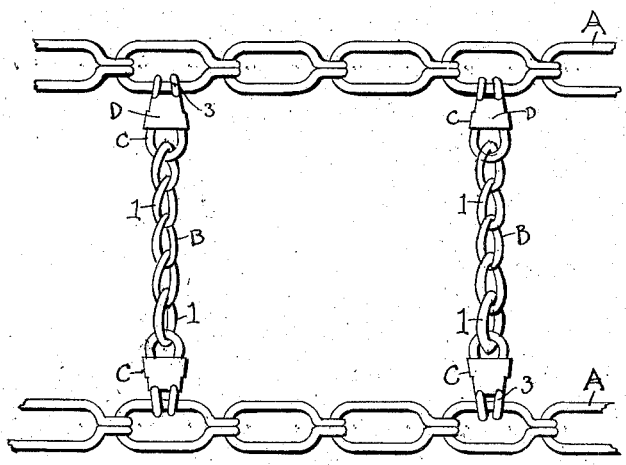
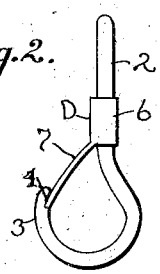
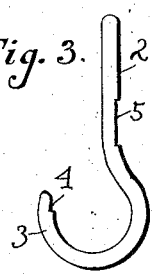
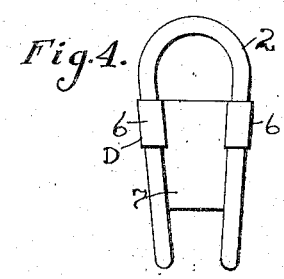
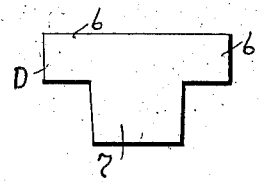
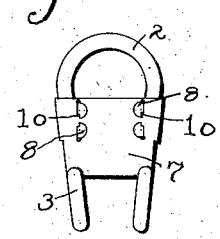
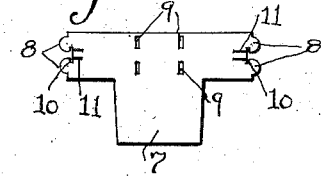
Inventor
CARL H. WIDSTRAND.
By N. S. Hill
Attorney

UNITED STATES PATENT OFFICE.

CARL HERBERT WIDSTRAND, OF CHICAGO, ILLINOIS.

CROSS-LINK FASTENER FOR NON-SKID CHAINS.

1,300,078.  Specification of Letters Patent.  Patented Apr. 8, 1919.

Application filed July 11, 1918. Serial No. 244,435.

*To all whom it may concern:*

Be it known that I, CARL H. WIDSTRAND, a citizen of the United States, residing at Chicago, in the county of Cook, State of Illinois, have invented a new and useful Cross-Link Fastener for Non-Skid Chains; and I do hereby declare the following to be a full, clear, and exact description of the invention, such as will enable others skilled in the art to which it appertains to make and use the same.

The present invention relates to a cross link for non-skid chains such as are commonly applied to the tires of motor vehicles, and has for its object to provide a device of this character which embodies novel features of construction whereby it can be readily attached to the side chains or detached therefrom without the use of any tools and without the necessity of removing the non-skid chain from the tire.

Further objects of the invention are to provide a device of this character which can be used in connection with the conventional non-skid chains now in use, which is inexpensive in its construction, which is not liable to become accidentally disengaged from the side chains, and which eliminates the difficult and dirty work that is usually incident to removing and replacing a broken cross chain.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a plan view of a portion of a non-skid tire chain provided with cross chains constructed in accordance with the invention.

Fig. 2 is an enlarged side elevation of one of the snap fasteners which are provided at the ends of the cross chains.

Fig. 3 is a side elevation of the hook member with the spring plate removed.

Fig. 4 is a rear elevation of one of the snap fasteners.

Fig. 5 is a plan view of the T-shaped blank which is applied to the hook member and provides a spring arm normally closing the same.

Fig. 6 is a plan view of a modified form of snap fastener.

Fig. 7 is a detail view of the T-shaped blank which is utilized in connection with the modification shown by Fig. 6.

Corresponding and like parts are referred to in the following description and indicated in all the views of the drawings by the same reference characters.

Referring to the drawings, which illustrate one embodiment of the invention, the reference characters A designate fragmentary portions of the side chains of an ordinary non-skid tire chain, said side chain being formed of elongated articulated links and being arranged upon opposite sides of the tire when the chain is in operative position thereon. The cross chains B which connect the side chains A and extend transversely across the tread of the tire are formed of a series of articulated links 1 and have snap fasteners C at the extremities thereof, said snap fasteners being adapted to detachably engage the links of the side chains and enabling a broken cross chain to be readily detached and replaced without the use of tools and without the necessity of soiling the hands if care is exercised. Each of the snap fasteners includes a U-shaped body 2, the ends of the arms of the body being returned at one side thereof to provide a pair of spaced and substantially parallel laterally projecting hooks 3. The extremities of the hooks are notched at 4 on the inner sides thereof, while the two sides or arms of the U-shaped body 2 have the rear faces thereof recessed at 5. A T-shaped sheet metal blank D has the head portion thereof applied to the U-shaped body 1 at the front thereof, and the laterally projecting wings 6 thereof bent around the side arms of the U-shaped body, thereby securely fastening the plate to the body. These wings are received within the recesses 5 at the back of the body 2, and engage the shoulders at the ends of the recesses to lock the plate against longitudinal movement upon the body and hold it securely in proper position. The middle or body portion 7 of the blank is deflected outwardly so that it extends diagonally across the mouth of the hook members 3 and normally closes the same, the free end of the member 7 being normally seated within the notches 4. It will thus be obvious that the member 7 forms a resilient locking tongue which normally closes the mouths of the hook members 3 and prevents accidental disengagement of the hook members from the side chains A. The inner wall of the spring tongue 7 is flush with the inner sides of the hook members so that there are no projections for the link of the side chain A to catch upon while the chain is being handled or manipulated. By forcibly pressing the spring tongue 7 inwardly the hook member can be readily placed in engagement with a link of the side chain A or disengaged therefrom, and it will be obvious that a broken cross chain can be removed and replaced without any loss of time or the use of tools, and even without the necessity of removing the anti-skid chain from the tire.

A slight modification is shown by Figs. 6 and 7, in which the lateral wings 6 of the T-shaped blank are provided with spaced tongues 8 which pass through openings 9 in the body of the blank without being bent around the side arms of the U-shaped body 2. The bases of the tongues 8 may be notched at the inner sides thereof, as indicated at 10, and slits 11 may be provided at the bases of the tongues, thereby enabling the tongues to spread or spring apart as they are forced into the openings 9, said tongues again coming together and the notches 10 engaging edges of the openings 9 when the tongues are in their final position. The tongues are then bent against the back of the T-shaped blank, and when this construction is employed it is impossible for the spring plate to become accidentally disengaged from the body of the snap hook, even when the device is subjected to very rough usage.

Having thus described the invention, what I claim as new and desire to secure by Letters Patent, is:—

1. A snap fastener including a U-shaped link having the arms thereof returned to provide hook members, and a T-shaped plate applied to the U-shaped link, the head portions of the plate having the lateral wings thereof wrapped around the arms of the link, while the body portion of the plate is deflected outwardly to provide a spring tongue which normally extends across the mouths of the hook members and yieldably engages the noses thereof.

2. A snap fastener including a U-shaped link having the arms thereof returned to provide hook members, said arms being also formed with recessed portions, and a T-shaped plate applied to the U-shaped link, the head portion of the plate having the lateral wings thereof wrapped around the arms of the link and in engagement with the recessed portions thereof, while the body portion of the plate is deflected outwardly to provide a spring tongue which normally extends across the mouths of the hook members and yieldably engages the noses thereof.

3. A snap fastener including a U-shaped link having the arms thereof returned to provide lateral hook members, and a T-shaped plate applied to the U-shaped link with the lateral wings of the head portion of the plate folded around the arms of the link while the body portion of the plate is deflected outwardly to provide a spring tongue which normally extends across the mouths of the hook members and yieldably engages the noses thereof, the before mentioned lateral wings terminating in tongues which penetrate and interlock with the body of the plate.

4. A snap fastener including a U-shaped link having the arms thereof returned to provide lateral hook members and also formed with recessed portions, and a T-shaped plate having the head thereof extending transversely across the link, the middle portion of the head being formed with openings and the lateral wings of the head being bent around the arms of the link while the body portion of the plate is deflected outwardly and forms a spring tongue which normally extends across the mouths of the hook members and engages the noses thereof, the lateral wings of the head engaging the recessed portions of the arms of the link and terminating in tongues which are inserted through the openings of the plate and interlock with the edges thereof.

In testimony whereof I have signed my name to this specification in the presence of two subscribing witnesses.

CARL HERBERT WIDSTRAND.

Witnesses:
   GARFIELD EDWARDS,
   CARL ROYCE.